(12) United States Patent
Usuda et al.

(10) Patent No.: US 8,483,228 B2
(45) Date of Patent: Jul. 9, 2013

(54) MOBILE COMMUNICATION SYSTEM, MOBILE STATION AND RADIO BASE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1433 days.

(21) Appl. No.: 11/667,915

(22) PCT Filed: Nov. 18, 2005

(86) PCT No.: PCT/JP2005/021305
§ 371 (c)(1),
(2), (4) Date: Nov. 1, 2007

(87) PCT Pub. No.: WO2006/054729
PCT Pub. Date: May 26, 2006

(65) Prior Publication Data
US 2008/0144568 A1    Jun. 19, 2008

(30) Foreign Application Priority Data

Nov. 18, 2004  (JP) ................................ 2004-335094

(51) Int. Cl.
*H04L 12/28* (2006.01)
(52) U.S. Cl.
USPC ...................................... 370/395.41; 370/349
(58) Field of Classification Search
USPC ......... 370/301.2, 328, 329, 338, 349, 395.21, 370/395.4, 395.41, 395.5, 401, 402
See application file for complete search history.

(56) References Cited

U.S. PATENT DOCUMENTS

| | | |
|---|---|---|
| 7,573,854 B2 * | 8/2009 | Heo et al. ..................... 370/335 |
| 2002/0071409 A1 | 6/2002 | Proctor, Jr. |
| 2003/0012172 A1 | 1/2003 | Choi et al. |
| 2004/0073690 A1 | 4/2004 | Hepworth et al. |
| 2004/0131106 A1 | 7/2004 | Kanterakis |
| 2004/0160959 A1 | 8/2004 | Balachandran et al. |
| 2004/0196867 A1 | 10/2004 | Ejzak et al. |
| 2004/0242219 A1 | 12/2004 | Oie et al. |
| 2006/0062146 A1 * | 3/2006 | Sebire et al. ................. 370/230 |

FOREIGN PATENT DOCUMENTS

| | | |
|---|---|---|
| EP | 0 993 149 A2 | 4/2000 |
| JP | 63-073786 A | 4/1988 |
| JP | 2002-271366 | 9/2002 |

(Continued)

OTHER PUBLICATIONS

NTT DoCoMo, "Autonomous Rate Ramping for Cell Level Rate Controll", TSG-RAN Working Group 1 #38, R1-040964, [online], 3rd Generation Partnership Project, Aug. 20, 2001.
Siemens, "Use of Services with Guaranteed Bit Rate on EDCH", 3GPP TSG-RAN WG3 Meething #43; R3-041073; Aug. 13, 2004.
Official Action Letter issued on Jun. 27, 2008 in the counterpart Korean patent application.

(Continued)

*Primary Examiner* — Brenda H Pham
(74) *Attorney, Agent, or Firm* — Marvin A. Motsenbocker; MOTS Law, PLLC

(57) ABSTRACT

The present invention relates to a channel allocating method for an IP multimedia subsystem which connects a radio access network and an IP network to provide voice communication and non-voice communication. In the channel allocating method according to the present invention, an enhanced dedicated channel is allocated to a channel for voice communication in a radio uplink, so as to improve a utilization efficiency of radio resources (hardware resources) and to prevent degradation of network capacity, in the channel for voice communication in the IMS.

6 Claims, 7 Drawing Sheets

FOREIGN PATENT DOCUMENTS

| | | |
|---|---|---|
| JP | 2004-165844 | 6/2004 |
| KR | 2003-5065 A | 1/2003 |
| KR | 2004-86589 A | 10/2004 |
| WO | WO 01/74096 A2 | 10/2001 |
| WO | 02/098099 A1 | 12/2002 |
| WO | WO 03/103329 | 12/2003 |
| WO | WO 2004/042954 A1 | 5/2004 |

OTHER PUBLICATIONS

3GPP TS 34.108; "3rd Generation Partnership Project; Technical Specification Group Terminals; Common Test Environments for User Equipment; Conformance Testing (Release 5)"; 3GPP;Sep. 2004; cover page, pp. 2 and 138.

\* cited by examiner

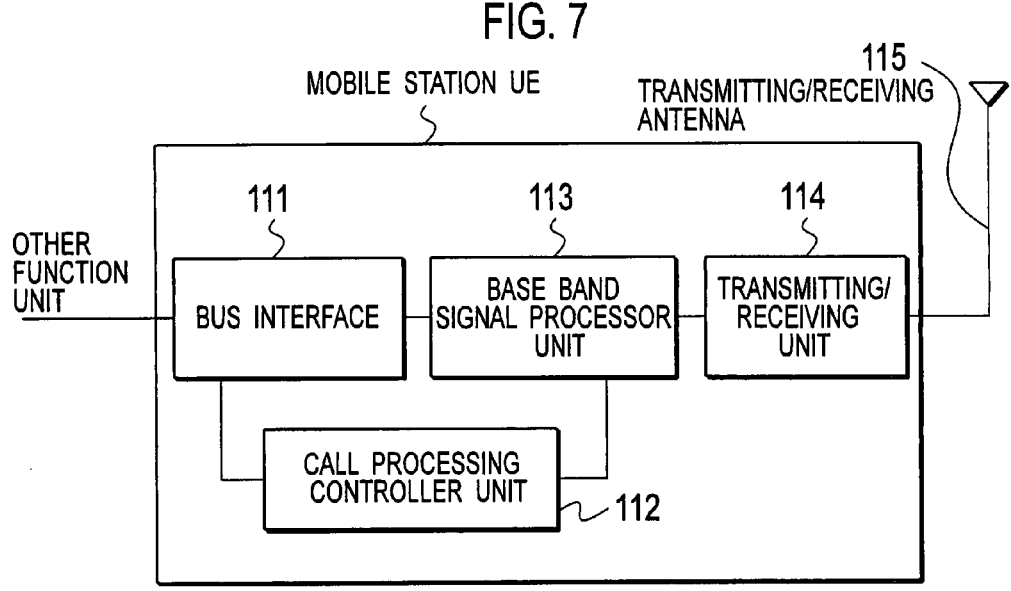
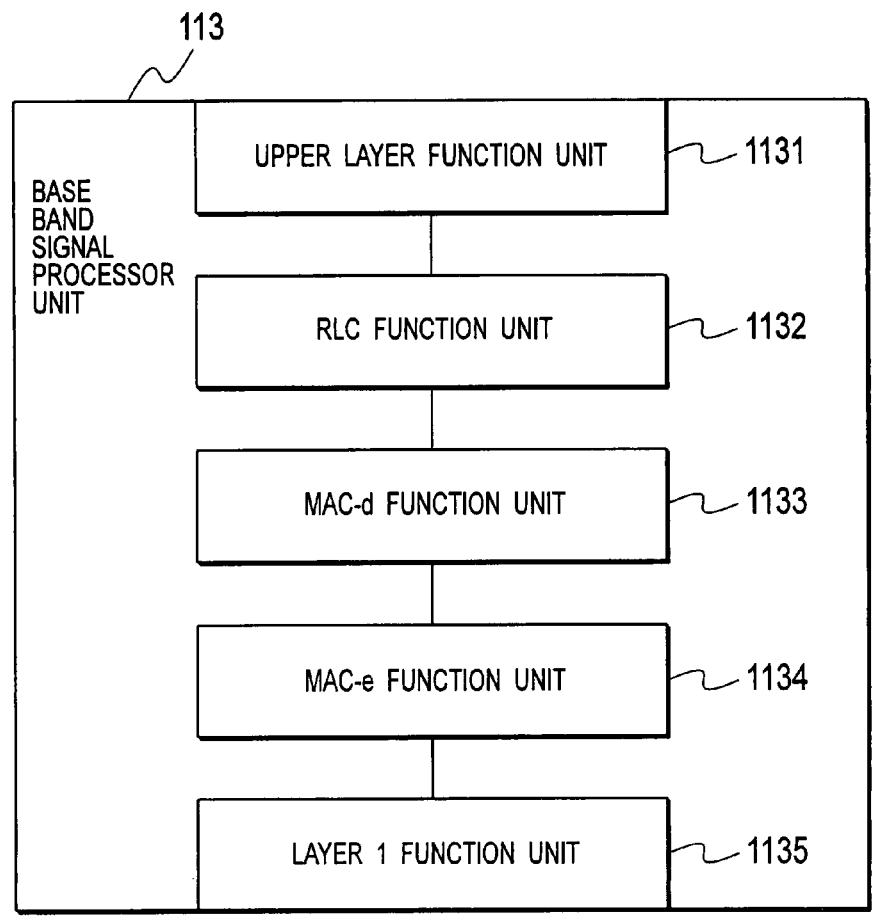

MOBILE COMMUNICATION SYSTEM, MOBILE STATION AND RADIO BASE STATION

TECHNICAL FIELD

The present invention relates to a channel allocation method for an IP multimedia subsystem which connects a radio access network and an IP network to provide voice communication and non-voice communication, and to a mobile station and a radio base station which are used for the channel allocation method.

BACKGROUND ART

In the "W-CDMA system" which has been studied in the 3GPP, a system has been studied recently which is capable of providing voice communication and non-voice communication by connecting a conventional mobile communication network to a network utilizing the Internet Protocol (IP network).

Such a system is referred to as an IMS (IP Multimedia Subsystem).

The IMS has been considered so that not only non-voice communication (for example, data communication and the like) but also voice communication having high requirements for delay can be provided through the IP network. In the Non-Patent Document 1, a channel for voice communication used in the IMS is defined.

However, when allocating a normal dedicated channel (DCH) to a channel for voice communication in the IMS, it is necessary to secure a bandwidth by assuming a highly bursty traffic, such as an RTCP signal (Real time Transport Control Protocol) or an SIP signal (Session Initiation Protocol). This results in problems of inefficiency in the use of radio resources (hardware resources) and of reduction in the network capacity.

In addition, the channel for voice communication guarantees a bandwidth not only for a usually-transmitted RTP signal (voice data) on which a header compression is performed, but also for other signals (for example, an RTP (Real time Transportation Protocol) signal on which a header compression is not performed, an SIP signal, an RTCP signal or the like), so that there is also a problem of inefficiency in the use of a radio resource (hardware resource).

[Non-Patent Document 1] 3GPP TS34.108 6. 10. 2. 4. 1. 5a. 1. 1. 1

DISCLOSURE OF THE INVENTION

Hence, the present invention has been made in light of the above-described problems, and an object thereof is to provide a channel allocating method, a mobile station, and a radio base station, which can improve efficiency in the use of a radio resource (hardware resource) for a channel for voice communication in the IMS, so that network capacity can be prevented from being reduced.

A first aspect of the present invention is summarized as a channel allocating method for an IP multimedia subsystem which connects a radio access network and an IP network to provide voice communication and non-voice communication, wherein an enhanced dedicated channel is allocated to a channel for voice communication in a radio uplink.

In the first aspect of the present invention, in the channel for voice communication, a bandwidth can be guaranteed to an RTP signal by using a guaranteed bit rate in the enhanced dedicated channel, and a bandwidth does not have to be guaranteed to a signal other than the RTP signal.

In the first aspect of the present invention, in the channel for voice communication, a bandwidth can be guaranteed to an RTP signal containing a compressed header by using the guaranteed bit rate in the enhanced dedicated channel, and a bandwidth does not have to be guaranteed to an RTP signal containing an uncompressed header.

A second aspect of the present invention is summarized as a mobile station used for an IP multimedia subsystem which connects a radio access network and an IP network to provide voice communication and non-voice communication, including: a channel allocating unit configured to allocate an enhanced dedicated channel to a channel for voice communication in a radio uplink.

In the second aspect of the present invention, the mobile station can further include: a bandwidth guaranteeing unit configured to guarantee, in the channel for voice communication, a bandwidth to an RTP signal by using a guaranteed bit rate in the enhanced dedicated channel, and not to guarantee a bandwidth to a signal other than the RTP signal.

In the second aspect of the present invention, the mobile station can further include: a bandwidth guaranteeing unit configured to guarantee, in the channel for voice communication, a bandwidth to an RTP signal containing a compressed header by using a guaranteed bit rate in the enhanced dedicated channel, and not to guarantee a bandwidth to an RTP signal containing an uncompressed header.

A third aspect of the present invention is summarized as a radio base station used for an IP multimedia subsystem which connects a radio access network and an IP network to provide voice communication and non-voice communication, including: a channel allocating unit configured to allocate an enhanced dedicated channel to a channel for voice communication in a radio uplink.

In the third aspect of the present invention, the radio base station can further include: a bandwidth guaranteeing unit configured to guarantee, in the channel for voice communication, a bandwidth to an RTP signal by using a guaranteed bit rate in the enhanced dedicated channel, and not to guarantee a bandwidth to a signal other than the RTP signal.

In the third aspect of the present invention, the radio base station can further include: a bandwidth guaranteeing unit configured to guarantee, in the channel for voice communication, a bandwidth to an RTP signal containing a compressed header by using a guaranteed bit rate in the enhanced dedicated channel, and not to guarantee a bandwidth to an RTP signal containing an uncompressed header.

A fourth aspect of the present invention is summarized as a channel allocating method for an IP multimedia subsystem which connects a radio access network and an IP network to provide voice communication and non-voice communication, wherein a radio network controller informs, to a mobile station and a base station, to guarantee a bandwidth to an RTP signal by using a guaranteed bit rate in an enhanced dedicated channel; and allocates the enhanced dedicated channel to a channel for voice communication in a radio uplink.

In the fourth aspect of the present invention, in the channel for voice communication, a bandwidth can be guaranteed to an RTP signal by using a guaranteed bit rate in the enhanced dedicated channel, and a bandwidth does not have to be guaranteed to a signal other than the RTP signal.

In the fourth aspect of the present invention, in the channel for voice communication, a bandwidth can be guaranteed to an RTP signal containing a compressed header by using the guaranteed bit rate in the enhanced dedicated channel, and a bandwidth does not have to be guaranteed to an RTP signal containing an uncompressed header.

BRIEF DESCRIPTION OF THE DRAWINGS

FIG. 7 is a functional block diagram of a mobile station of a third embodiment of the present invention.

FIG. 8 is a functional block diagram of a base band signal processor unit of a mobile station of the third embodiment of the present invention.

BEST MODES FOR CARRYING OUT THE INVENTION (Mobile Communication System of First Embodiment of the Present Invention)

A mobile communication system of a first embodiment of the present invention will be described with reference to FIGS. 1 to 5.

Figure 1:
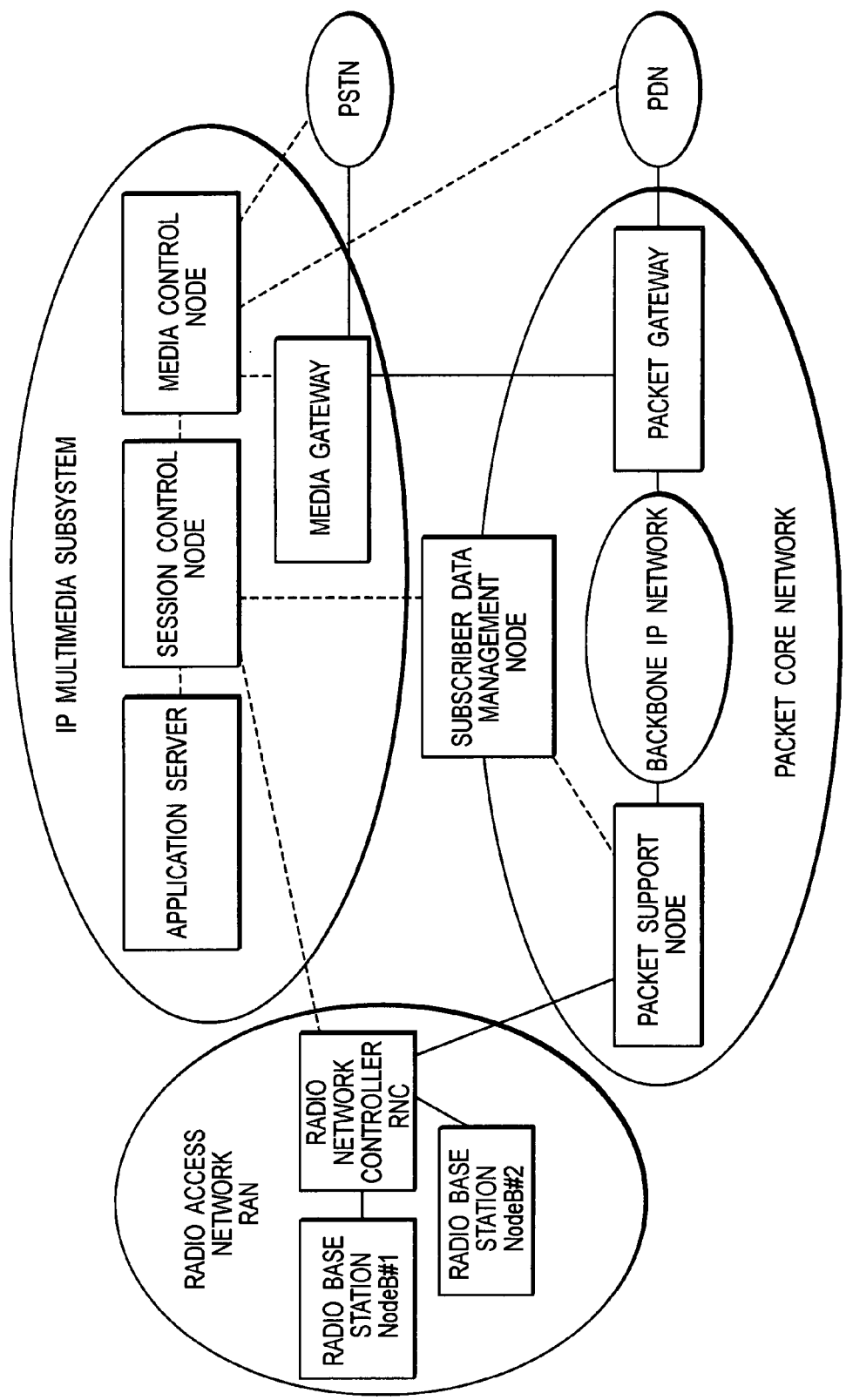
FIG. 1 is a diagram for showing the entire configuration of a mobile communication system of an embodiment of the present invention.

As shown in FIG. 1, the mobile communication system of the present embodiment includes a radio access network RAN, a packet core network, and an IMS (IP Multimedia Subsystem).

As shown in FIG. 1, the IMS (IP Multimedia Subsystem) includes a media gateway, a media control node, a session control node, and an application server.

Further, the packet core network includes a backbone IP network, a packet gateway, a packet support node, and a subscriber data management node.

Figure 2:
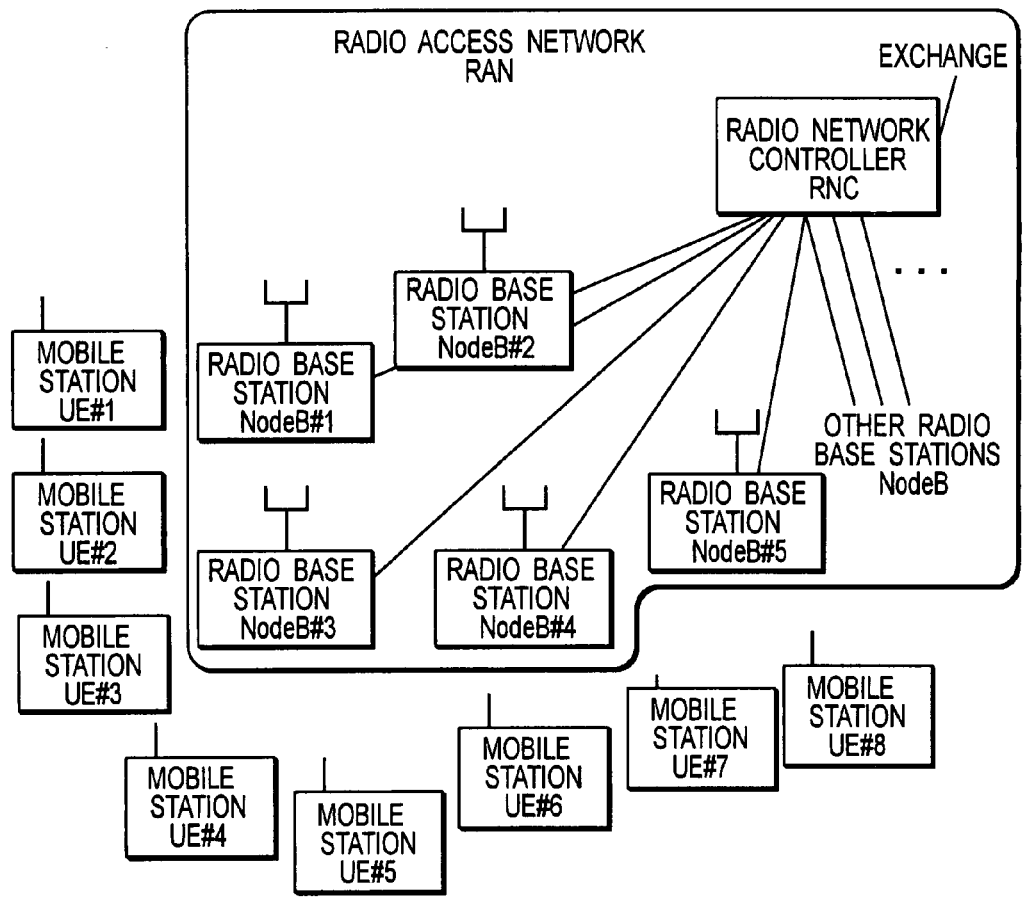
FIG. 2 is a diagram for showing a configuration of a radio access network of the mobile communication system of an embodiment of the present invention.

As shown in FIG. 2, the radio access network RAN includes a plurality of radio base stations Node B #1 to #5, and a radio network controller RNC. A plurality of mobile stations UE #1 to #8 are configured to be connected, respectively, to the plurality of radio base stations Node B #1 to #5, through a radio uplink and a radio downlink.

The mobile station UE of the present invention is configured to be used in the IP Multimedia Subsystem which connects a radio access network RAN and a packet core network (backbone IP network), whereby voice communication and non-voice communication are provided. Incidentally, the mobile station UE is provided with a VoIP (Voice over IP) function which is configured to perform voice communication on an upper layer of the IP layer.

Figure 3:
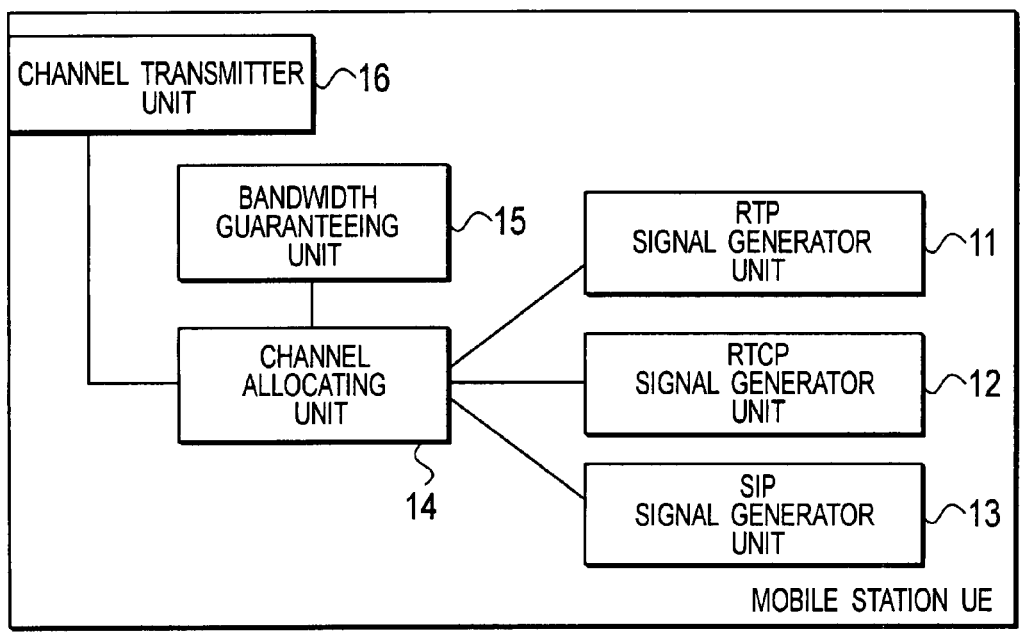
FIG. 3 is a functional block diagram of a mobile station of the embodiment of the present invention.

To be more precise, as shown in FIG. 3, the mobile station UE of the present embodiment includes, as functions of the present invention, an RTP signal generator unit 11, an RTCP signal generator unit 12, an SIP signal generator unit 13, a channel allocating unit 14, a bandwidth guaranteeing unit 15, and a channel transmitter unit 16.

The RTP signal generator unit 11 is configured to generate an RTP signal for transmitting voice data, based on an instruction from the VoIP function. Further, the RTP signal generator unit 11 is configured to usually compress an RTP header of the RTP signal. The RTP signal generator unit 11 is configured to add an RTP header, which is not compressed, to the RTP signal, when an error occurs or the like.

The RTCP signal generator unit 12 is configured to generate an RTCP signal for transmitting control data which are necessary when transmitting voice data, based on an instruction from the VoIP function.

The SIP signal generator unit 13 is configured to generate an SIP signal for transmitting control data (call initiating data) to establish a VoIP connection. Incidentally, the SIP signal is generated on irregular basis according to an instruction from a user of a mobile station UE.

Here, the channel for voice communication in a radio uplink contains the above-described RTP signal, RTCP signal, SIP signal, and the like.

The channel allocating unit 14 is configured to allocate an "enhanced dedicated channel (EDCH)" being a channel to which the "Enhanced Uplink" is applied, to a channel for voice communication in a radio uplink.

In addition, the Enhanced Uplink is a specification established in the "3GPP TS25.309 v6.0.0" by a working committee set up for improving network capacity in communication in a radio uplink, improving efficiency in use of resources, improving throughput and the like.

To the enhanced dedicated channel (EDCH), a HARQ (Hybrid ARQ) process, a transmission rate control process, a scheduling process in a radio base station Node B, and the like are applied, and hence the enhanced dedicated channel (EDCH) is appropriate to handle burst data which are not frequently transmitted.

Further, to the enhanced dedicated channel (EDCH), a "guaranteed bit rate" is introduced, whereby the enhanced dedicated channel (EDCH) is provided with a function which guarantees a necessary bandwidth for each channel.

Using such a Guaranteed bit rate, the bandwidth guaranteeing unit 15 is configured to guarantee a bandwidth (to guarantee the allocation of a radio resource or hardware resource) to various signals for a channel for voice communication.

Figure 4:
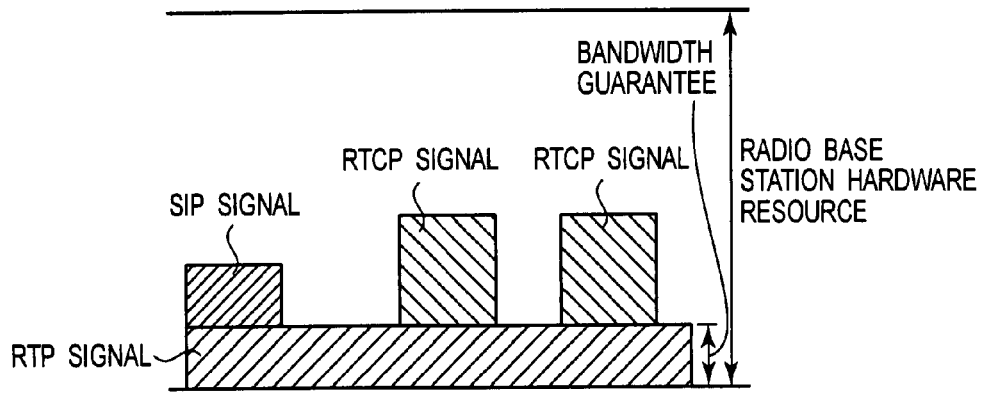
FIG. 4 is a diagram for illustrating an example of a channel allocating method of the embodiment of the present invention.

For example, as shown in FIG. 4, the bandwidth guaranteeing unit 15 may be configured to guarantee a bandwidth to an RTP signal by using the guaranteed bit rate in the enhanced dedicated channel (EDCH), and not to guarantee a bandwidth to a signal (for example, an SIP signal or an RTCP signal) other than the RTP signal, in a channel for voice communication.

Figure 5:
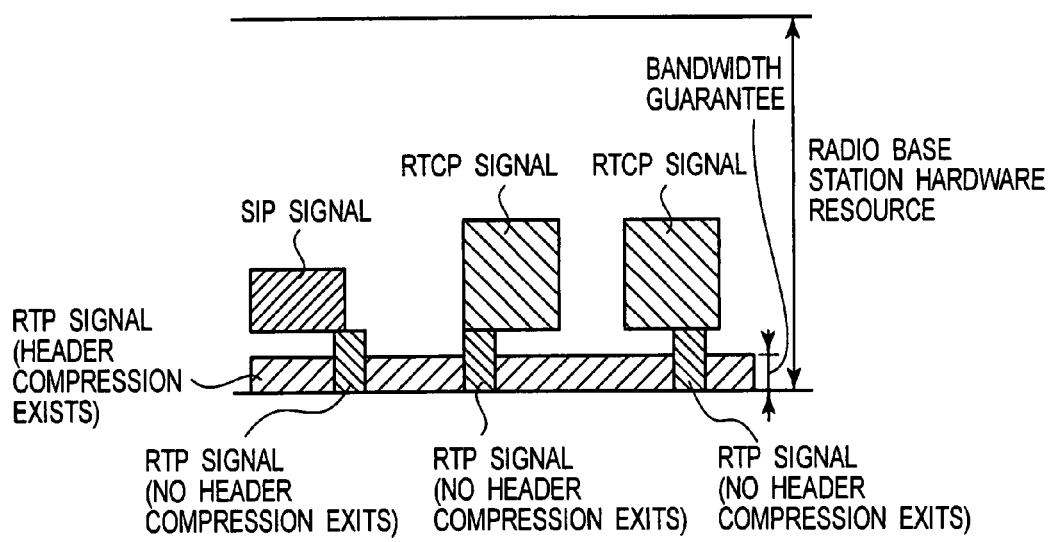
FIG. 5 is a diagram for illustrating an example of a channel allocating method of the embodiment of the present invention.

Further, as shown in FIG. 5, the bandwidth guaranteeing unit 15 may be configured to guarantee a bandwidth to an RTP signal in which a header is compressed, by using the guaranteed bit rate in the enhanced dedicated channel (EDCH), and not to guarantee a bandwidth to an RTP signal in which a header is not compressed (or an SIP signal, or an RTCP signal), in a channel for voice communication.

(Operation and Effect of Mobile Communication System of First Embodiment of the Present Invention)

According to the mobile communication system of the present embodiment, the enhanced dedicated channel (EDCH) is allocated to a channel for voice communication of a radio uplink of the IMS, whereby efficiency in the use of a radio resource (hardware resource in a radio base station Node B) is improved so that network capacity can be increased.

According to the mobile station UE of the present embodiment, a bandwidth is guaranteed to an RTP signal for transmitting voice data, and best effort is made without guaranteeing a bandwidth to a signal (for example, an SIP signal or an RTCP signal) other than the RTP signal for transmitting other data, so that the quality of voice communication is guaranteed, and at the same time, effective use of a radio resource (hardware resource at a radio base station Node B) is made possible.

According to the mobile station UE of the present embodiment, a bandwidth is guaranteed to an RTP signal in which a header is compressed which is usually transmitted, and best effort is made without guaranteeing a bandwidth to a RTP signal in which a header is not compressed. Thus, it is unnecessary to allocate a radio resource (hardware resource) to such signal in a fixed manner, whereby a radio resource (hardware resource) can be shared with another mobile station UE, so that efficiency in the use of a radio resource (hardware resource) can be enhanced to a great extent.

(Mobile Communication System of Second Embodiment of the Present Invention)

A mobile communication system of a second embodiment of the present invention is described with reference to FIG. 6.

A radio base station Node B of the present embodiment is configured to be used in the IP Multimedia Subsystem which connects a radio access network and an IP network so that voice communication and non-voice communication can be provided. Further, the radio network controller RNC of the present embodiment is a device located in an upper level of the radio base stations Node B #1 to #5, and is configured to control radio communication between a radio base station Node B and a mobile station UE.

Figure 6:
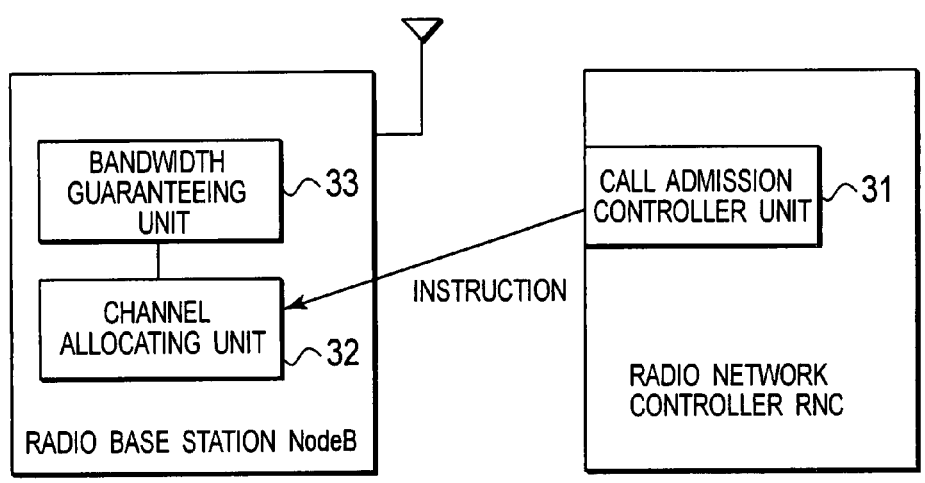
FIG. 6 is a functional block diagram of a radio base station and a radio network controller of a second embodiment of the present invention.

As shown in FIG. 6, the radio network controller RNC includes a call admission controller unit 31, as a function of the present invention.

The call admission controller unit 31 is configured to make the following instruction to a channel allocating unit 32 of a radio base station Node B: to receive call initiating data used for setting a channel in a radio uplink for voice communication between a mobile station UE and a radio base station Node B; and then to allocate a channel to the channel for voice communication in response to the received call initiating data.

As shown in FIG. 6, the radio base station Node B of the present embodiment includes the channel allocating unit 32 and a bandwidth guaranteeing unit 33, as functions of the present invention.

The channel allocating unit 32 is configured to allocate an enhanced dedicated channel (EDCH) to the appropriate channel for voice communication, in response to an instruction from the call admission controller unit 31 of the radio network controller RNC.

Incidentally, after the channel for voice communication has been temporarily set, the channel allocating unit 32 is capable of varying the enhanced dedicated channel (EDCH) to be allocated to the channel for voice communication, in a predetermined cycle.

The bandwidth guaranteeing unit 33 is configured to guarantee a bandwidth (to guarantee the allocation of radio resource or hardware resource) to various signals for a channel for voice communication, by using the guaranteed bit rate in the enhanced dedicated channel (EDCH).

For example, as shown in FIG. 4, the bandwidth guaranteeing unit 33 may be configured to guarantee a bandwidth to an RTP signal by using the guaranteed bit rate in the enhanced dedicated channel (EDCH), and not to guarantee a bandwidth to a signal (for example, an SIP signal or an RTCP signal) other than the RTP signal, in a channel for voice communication.

Further, as shown in FIG. 5, the bandwidth guaranteeing unit 33 may be configured to guarantee a bandwidth to an RTP signal in which a header is compressed, by using the guaranteed bit rate in the enhanced dedicated channel (EDCH), and not to guarantee a bandwidth to an RTP signal in which a header is not compressed (or an SIP signal, or an RTCP signal), in a channel for voice communication.

(Operation and Effect of Mobile Communication System of Second Embodiment of the Present Invention)

According to the mobile communication system of the present embodiment, the enhanced dedicated channel (EDCH) is allocated to a channel for voice communication of a radio uplink of the IMS, whereby efficiency in the use of radio resource (hardware resource in a radio base station Node B) is improved so that network capacity can be increased.

According to the radio base station Node B of the present embodiment, a bandwidth is guaranteed to an RTP signal for transmitting voice data, and best effort is made without guaranteeing a bandwidth to a signal (for example, an SIP signal or an RTCP signal) other than the RTP signal for transmitting other data, so that the quality of voice communication is guaranteed, and at the same time, effective use of radio resource (hardware resource at a radio base station) is made possible.

According to the radio base station Node B of the present embodiment, a bandwidth is guaranteed to an RTP signal in which a header is compressed which is usually transmitted, and best effort is made without guaranteeing a bandwidth to a signal in which a header is not compressed. Thus, it is unnecessary to allocate radio resource (hardware resource) to such a signal in a fixed manner, whereby radio resource (hardware resource) can be shared with another mobile station UE, so that efficiency in the use of radio resource (hardware resource) can be enhanced to a great extent.

(Mobile Communication System of Third Embodiment of the Present Invention)

The mobile communication system of the above-described first embodiment is more specifically described with reference to FIGS. 1 to 12.

A mobile communication system of the present embodiment is similar to that of the first embodiment. Hence, only a major difference compared to the first embodiment is described.

The mobile communication system of the present embodiment realizes an IP-based multimedia communication using a packet core network of an IMS (IP Multimedia Subsystem). Here, multimedia communication includes voice communication of real-time performance (in the present embodiment, in addition to voice, interactive multimedia such as a TV phone, streaming and the like are also described as "voice communication"), and non-voice communication such as e-mail and Web browsing.

As shown in FIG. 1, the mobile communication system of the present embodiment includes a radio access network RAN, a packet core network, and an IMS (IP Multimedia Subsystem).

For example, consider a case where a mobile station UE connected to the radio access network RAN makes voice communication with a communication terminal connected to the packet communication network PDN or a communication terminal connected to a line switching network PSTN. Here, a connection for voice communication for END-TO-END using an SIP (Session Initiation Protocol) is established by using a session control node of the IMS (IP Multimedia Subsystem).

Further, in a case where the mobile station UE connected to the radio access network RAN makes voice communication with the communication terminal connected to the packet communication network PDN, by using the established connection for voice communication, voice data (RTP signal and the like) are transmitted through the packet core network.

Meanwhile, when the mobile station UE connected to the radio access network RAN makes voice communication with the communication terminal connected to the line switching network PSTN, by using the established connection for voice communication, voice data (RTP signal and the like) are transmitted through the packet core network and a media gateway of the IMS.

It should be noted that, a subscriber management node provides an HLR (Home Location Register) function to discriminate a communication terminal at the destination of the communication.

Specially, in the present embodiment, described is a method in which, when a mobile station UE makes voice communication using the IMS, a channel is allocated so that efficiency in the use of uplink radio resource and the like can be improved, in a radio access network RAN, as shown in FIG. 2.

Incidentally, on effective utilization of uplink radio resource, a high speed uplink radio resource control method by a layer 1 and a MAC sub-layer (layer 2) between a radio base station Node B and a mobile station UE has been studied in the "3GPP", which is an international standardization organization for Third Generation Mobile Communication Systems. The abovementioned study or studied function is collectively termed as an "Enhanced Uplink (EUL)".

The mobile communication system of the present embodiment is configured so that, an enhanced dedicated channel (EDCH) of the above Enhanced Uplink (EUL) is allocated to the channel for voice communication in a radio uplink.

Incidentally, the enhanced dedicated channel (EDCH) is a transport channel used in the Enhanced Uplink (EUL), which has a "non scheduled transmission function" and a "scheduled transmission function" to perform an uplink radio resource control.

The non scheduled transmission function is configured to secure radio resources in a fixed manner to "guarantee a bandwidth" so that data, which is to be transmitted frequently, can be transmitted at a fixed transmission bit rate in the enhanced dedicated channel (EDCH).

To be more precise, using the "guaranteed bit rate" notified from the radio network controller RNC, the radio base station Node B secures radio resources satisfying the "guaranteed bit rate" for a mobile station UE, whereby the mobile station UE can transmit data for uplink at a fixed guaranteed bit rate.

Meanwhile, the scheduled transmission function is configured to dynamically secure radio resources required when transmitting bursty data, not so frequently transmitted, and hence "not to guarantee a bandwidth".

Further, in the scheduled transmission function, a transmission bit rate of data is dynamically controlled using scheduling information which is transmitted from the radio base station Node B by an E-AGCH (absolute grant channel), an E-RGCH (relative grant channel) and the like.

In the mobile communication system of the present embodiment, when the mobile station UE makes voice communication through the IMS, the VoIP (Voice over IP) being an IP-based protocol for voice communication is used.

Under the VoIP, user data for voice communication such as an RTP signal, and control data for voice communication such as an RTCP signal and an SIP signal are transmitted.

In the case of the user data for voice communication such as an RTP signal, although the data size is not so large, the frequency of transmission is high, and real-time performance is required. Accordingly, in the mobile communication system of the present embodiment, the enhanced dedicated channel (EDCH) which "guarantees a bandwidth" is allocated to the user data for voice communication, so that a fixed transmission bit rate is guaranteed, whereby voice communication of high stability and high quality can be made possible.

Meanwhile, in the case of the control data such as an RTCP signal and an SIP signal, although the frequency of transmission is not so high, the data are of a bursty characteristic. Therefore, in the mobile communication system of the present embodiment, the enhanced dedicated channel (EDCH) which does not "guarantee a bandwidth" is allocated to the control data for voice communication, so that radio data resource can be efficiently secured to bursty data.

An example of a configuration of a mobile station and an example of operation thereof are described below in detail. Specifically, the example is for the case where, when a mobile station UE makes voice communication using the IMS, a channel for voice communication is allocated to either the enhanced dedicated channel (EDCH) which "guarantees a bandwidth", or the enhanced dedicated channel (EDCH) which "does not guarantee a bandwidth".

First, a configuration of such a mobile station UE is described with reference to FIG. 7.

In FIG. 7, an example of a diagrammatic configuration of a mobile station UE of the present embodiment is shown. As shown in FIG. 7, the mobile station UE includes a bus interface unit 111, a call processing controller unit 112, a base band signal processor unit 113, a transmitting/receiving unit 114, and a transmitting/receiving antenna 115. Further, the mobile station UE is configured to include an amplifier unit (not shown).

It should be noted that, these configurations are not necessarily required to be independent hardware. In other words, each of the configurations may be incorporated to another, or may be configured by processes in software.

In FIG. 8, functional blocks of the base band signal processor unit 113 are shown. As shown in FIG. 8, the base band signal processor unit 113 includes an upper layer function unit 1131, an RLC function unit 1132 functioning as an RLC sub-layer, a MAC-d function unit 1133, a MAC-e function unit 1134, and a layer 1 function unit 1135 functioning as a layer 1.

The upper layer function unit 1131 includes the VoIP function described in the first embodiment, and is configured to generate an RTP signal, an RTCP signal and an SIP signal.

To be more precise, the upper layer function unit 1131 is configured to have functions which, in FIG. 3, correspond to the RTP signal generator unit 11 for generating an RTP signal, the RTCP signal generator unit 12 for generating an RTCP signal, and the SIP signal generator unit 13 for generating an SIP signal.

The upper layer function unit 1131 is configured to discriminate an RTP signal, an RTCP signal, and an SIP signal which are generated, and to classify the signals into user data for voice communication, and control data for voice communication.

For example, the upper layer function unit 1131 classifies the RTP signal into the user data for voice communication, and classifies the RTCP signal and the SIP signal into the control data for voice communication. Incidentally, the mobile station UE may be configured so that, a criterion for such a classification may be informed from the radio network controller RNC to the mobile station UE or may be preset in the mobile station UE.

Further, the upper layer function unit 1131 is configured to include an RRC (Radio Resource Control) function.

The upper layer function unit 1131 (RRC function) is configured to instruct the MAC-e function unit 1134 to be described later, so that the MAC-e function unit 1134 "guarantees a bandwidth" to the user data for voice communication and "does not guarantee a bandwidth" to the control data for voice communication.

The upper layer function unit 1131 (RRC function) sets a channel for voice communication with which the mobile station UE makes voice communication through the IMS.

Figure 9:
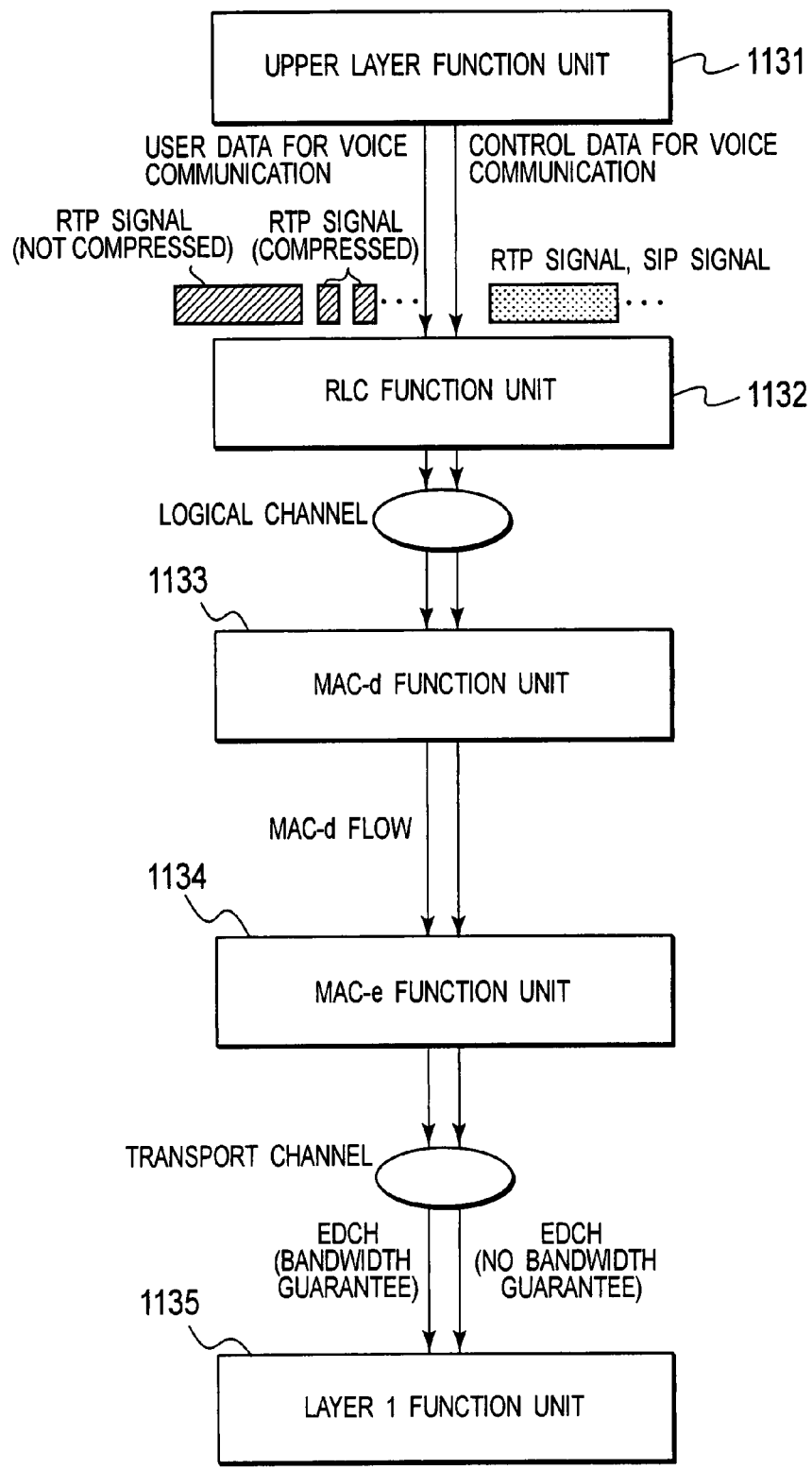
FIG. 9 is a diagram for illustrating functions of the base band signal processor unit of the mobile station of the third embodiment of the present invention.

As shown in FIG. 9, the upper layer function unit 1131 discriminates the user data for voice communication such as an RTP signal and the control data for voice communication such as an RTCP signal and an SIP signal, and transmits the respective data to the RLC function unit 1132 in different flows.

The RLC function unit 1132 is configured to transmit the user data for voice communication and the control data for voice communication received from the upper layer function unit 1131, to the MAC-d function unit 1133 in respective flows through a logical channel.

The MAC-d function unit 1133 generates a MAC-d PDU including the user data for voice communication and a MAC-d PDU including the control data for voice communication, and these generated MAC-d PDUs are each transmitted as a MAC-d flow, to the MAC-e function unit 1134.

The MAC-e function unit 1134 functions as a lower layer of the MAC-d function unit 1133, and allocates a transport channel to the MAC-d flow, controls a transmission bit rate (transmission data block size), and controls retransmission by a Hybrid ARQ (HARQ).

Figure 10:
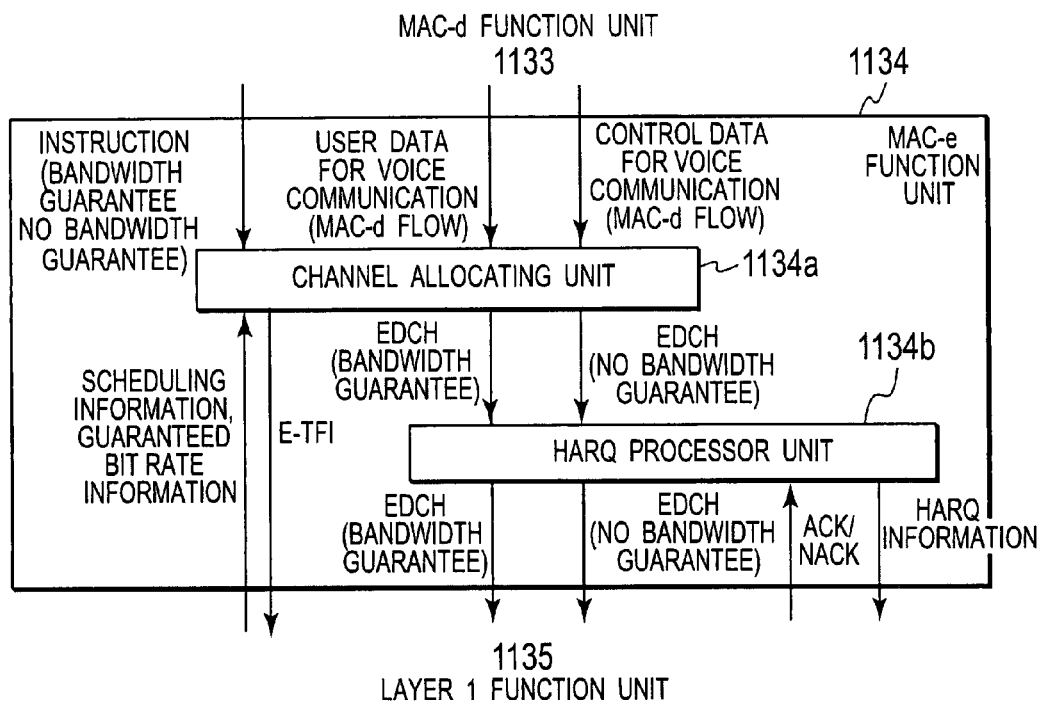
FIG. 10 is a functional block diagram of a MAC-e function unit of the base band signal processor unit of the mobile station of the third embodiment of the present invention.

To be more precise, as shown in FIG. 10, the MAC-e function unit 1134 includes a channel allocating unit 1134*a* and an HARQ processor 1134*b*.

The channel allocating unit 1134*a* is configured to generate a transport block, based on the MAC-d PDU received as the MAC-d flow, and allocates an enhanced dedicated channel (EDCH) being a transport channel.

The channel allocating unit 1134*a* receives the MAC-d PDU at least from the MAC-d flow of the user data for voice communication and the MAC-d flow of the control data for voice communication. The channel allocating unit 1134*a* is configured to determine whether or not to guarantee a bandwidth to each MAC-d flow according to an instruction from the upper layer function unit 1131.

For example, the channel allocating unit 1134*a* allocates an enhanced dedicated channel (EDCH) "guaranteeing a bandwidth", to the MAC-d flow of the user data for voice communication, according to an instruction from the upper layer function unit 1131.

To be more precise, the channel allocating unit 1134*a* generates a transport block from the MAC-d PDU received as the MAC-d flow of the user data for voice communication. A transmission bit rate (transmission data block size) of the transport block is determined on the basis of the guaranteed bit rate information received from the radio network controller RNC through the radio base station Node B, and is informed to the layer 1 function unit 1135 as an E-TFI. Here, the guaranteed bit rate information is information which is informed from the radio base station Node B and from which the "guaranteed bit rate" can be determined using a predetermined power offset and the like.

Further, when the size of the MAC-d PDU received as the MAC-d flow of the user data for voice communication is not greater than a predetermined size informed in advance from the upper layer function unit 1131 (RRC function), the channel allocating unit 1134*a* may determine that a compressed RTP signal is contained, and may allocate the enhanced dedicated channel (EDCH) "guaranteeing a bandwidth". When the size of the MAC-d PDU is greater than the predetermined size informed from the upper layer function unit 1131 (RRC function), it may be determined that an RTP signal which is not compressed is contained, and the enhanced dedicated channel (EDCH) "not guaranteeing a bandwidth" may be allocated.

Further, the channel allocating unit 1134*a* allocates the enhanced dedicated channel (EDCH) "not guaranteeing a bandwidth" to the MAC-d flow of the control data for voice communication, according to an instruction from the upper layer function unit 1131.

To be more precise, the channel allocating unit 1134*a* generates a transport block from the MAC-d PDU received as the MAC-d flow of the control data for voice communication. A transmission bit rate (transmission data block size) of the transport block is determined, on the basis of an amount of data of the MAC-d PDU passed from the MAC-d function unit 1133 and scheduling information received from the radio base station Node B, and is informed to the layer 1 function unit 1135 as an E-TFI.

The channel allocating unit 1134*a* corresponds to the channel allocating unit 14 and the bandwidth guaranteeing unit 15 in FIG. 3.

Here, a radio resource control by means of "bandwidth guarantee" of the enhanced dedicated channel (EDCH) is exemplified in FIG. 4.

For example, as shown in FIG. 4, since a predetermined radio resource is secured by means of "bandwidth guarantee" for the user data for voice communication (RTP signal) allocated to the enhanced dedicated channel (EDCH) "guaranteeing a bandwidth", the above user data for voice communication is transmitted at a fixed transmission bit rate (transmission block size) using the "guaranteed bit rate". Further, a necessary radio resource is secured as needed for the control data for voice communication (SIP signal, RTCP signal) allocated to the enhanced dedicated channel (EDCH) "not guaranteeing a bandwidth", and the above control data for voice communication is transmitted at a transmission bit rate (transmission block size) in the best effort.

Next, in FIG. 5, a radio resource control is exemplified in which an "RTP signal to which a header compression is performed" and an "RTP signal to which a header compression is not performed" are transmitted.

As shown in FIG. 5, since a predetermined radio resource is secured by means of "bandwidth guarantee" for the "RTP signal to which a header compression is performed", allocated to the enhanced dedicated channel (EDCH) "guaranteeing a bandwidth", the "RTP signal to which a header compression is performed" is transmitted at a fixed transmission bit rate (transmission block size) using the "guaranteed bit rate".

Additionally, at the time when the "RTP signal to which a header compression is not performed" is transmitted, the "RTP signal to which a header compression is performed" is not transmitted, so that the radio resource secured by the "bandwidth guarantee" is not used.

As a result, the "RTP signal to which a header compression is not performed" which is allocated to the enhanced dedicated channel (EDCH) "not guaranteeing a bandwidth" is transmitted using the radio resource secured by the "bandwidth guarantee". Accordingly, a radio resource is newly secured only for that which was insufficient by the securing by the "bandwidth guarantee". Hence, the "RTP signal to which a header compression is not performed" is transmitted at a transmission bit rate (transmission block size) in the best effort.

As shown in FIGS. 4 and 5, since it is unnecessary to constantly "guarantee a bandwidth" to an SIP signal, an RTCP signal, an RTP signal in which a header compression is not performed, or the like, radio resources can be efficiently used in the radio resource control.

The HARQ processor unit 1134b is configured to perform a retransmission control process using the N-channel Stop and Wait (N-SAW) protocol, on the basis of an Ack/Nack for data for voice communication informed from the layer 1 function unit 1135.

Incidentally, in the present embodiment, the "guaranteed bit rate" has been described as one informed in the form of guaranteed bit rate information from the radio network controller RNC, at a predetermined timing. However, the "guaranteed bit rate" may be determined in advance in a mobile station UE.

Figure 11:
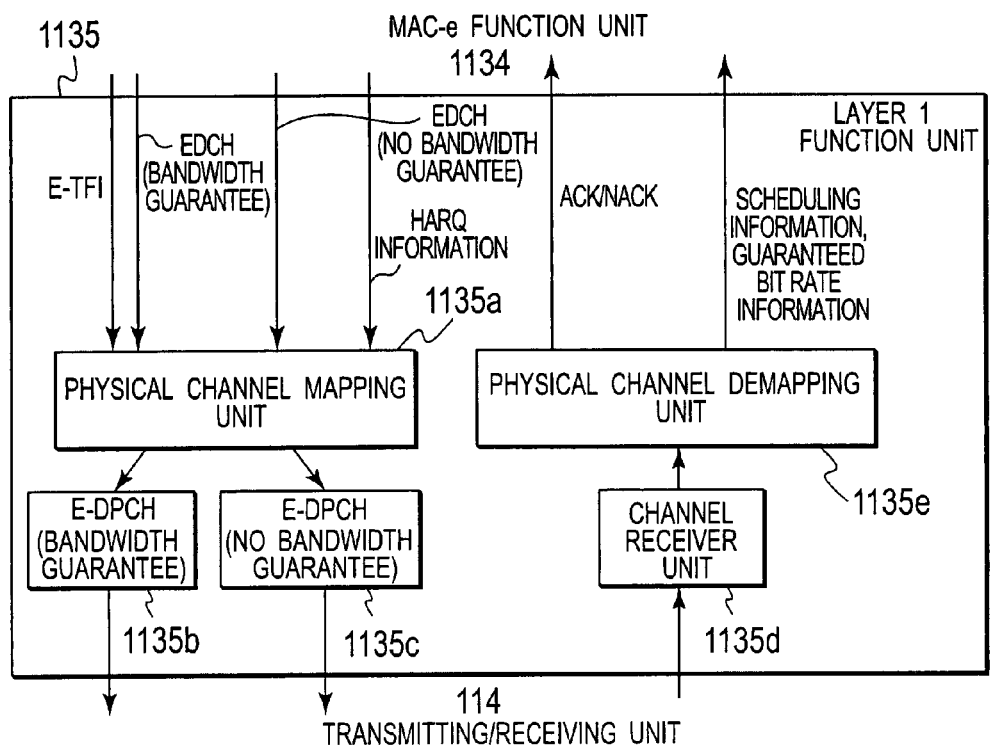
FIG. 11 is a functional block diagram of a layer 1 function unit of the base band signal processor unit of the mobile station of the third embodiment of the present invention.

As shown in FIG. 11, the layer 1 function unit 1135 includes a physical channel mapping unit 1135a, an E-DPCH transmitter unit (bandwidth guarantee) 1135b, an E-DPCH transmitter unit (no bandwidth guarantee) 1135c, a channel receiver unit 1135d, and a physical channel demapping unit 1135e.

The physical channel mapping unit 1135a is configured to associate an encoded enhanced dedicated channel (EDCH) "guaranteeing a bandwidth" with an enhanced dedicated physical data channel (E-DPDCH) (bandwidth guarantee), and to associate the E-TFI and the HARQ information from the MAC-e function unit 1134 with an enhanced dedicated physical control channel (E-DPCCH) (bandwidth guarantee).

Further, the physical channel mapping unit 1135a is configured to associate the encoded enhanced dedicated channel (EDCH) "not guaranteeing a bandwidth" with the enhanced dedicated physical data channel (E-DPDCH) (no bandwidth guarantee), and to associate the E-TFI and the HARQ information from the MAC-e function unit 1134 with the enhanced dedicated physical control channel (E-DPCCH) (no bandwidth guarantee).

The E-DPCH transmitter unit (bandwidth guarantee) 1135b is configured to perform transmitting processes of the above-described E-DPDCH and E-DPCCH with bandwidth guarantee; and the E-DPCH transmitter unit (no bandwidth guarantee) 1135c is configured to perform transmitting processes of the above-described E-DPDCH and E-DPCCH with no bandwidth guarantee.

The channel receiver unit 1135d is configured to receive the guaranteed bit rate information from the radio network controller RNC, and to receive the scheduling information from the radio base station Node B.

Further, the physical channel demapping unit 135h is configured to extract the scheduling information and the guaranteed bit rate information, and to transmit the scheduling information and the guaranteed bit rate information thus extracted, to the MAC-e function unit 134.

Figure 12:
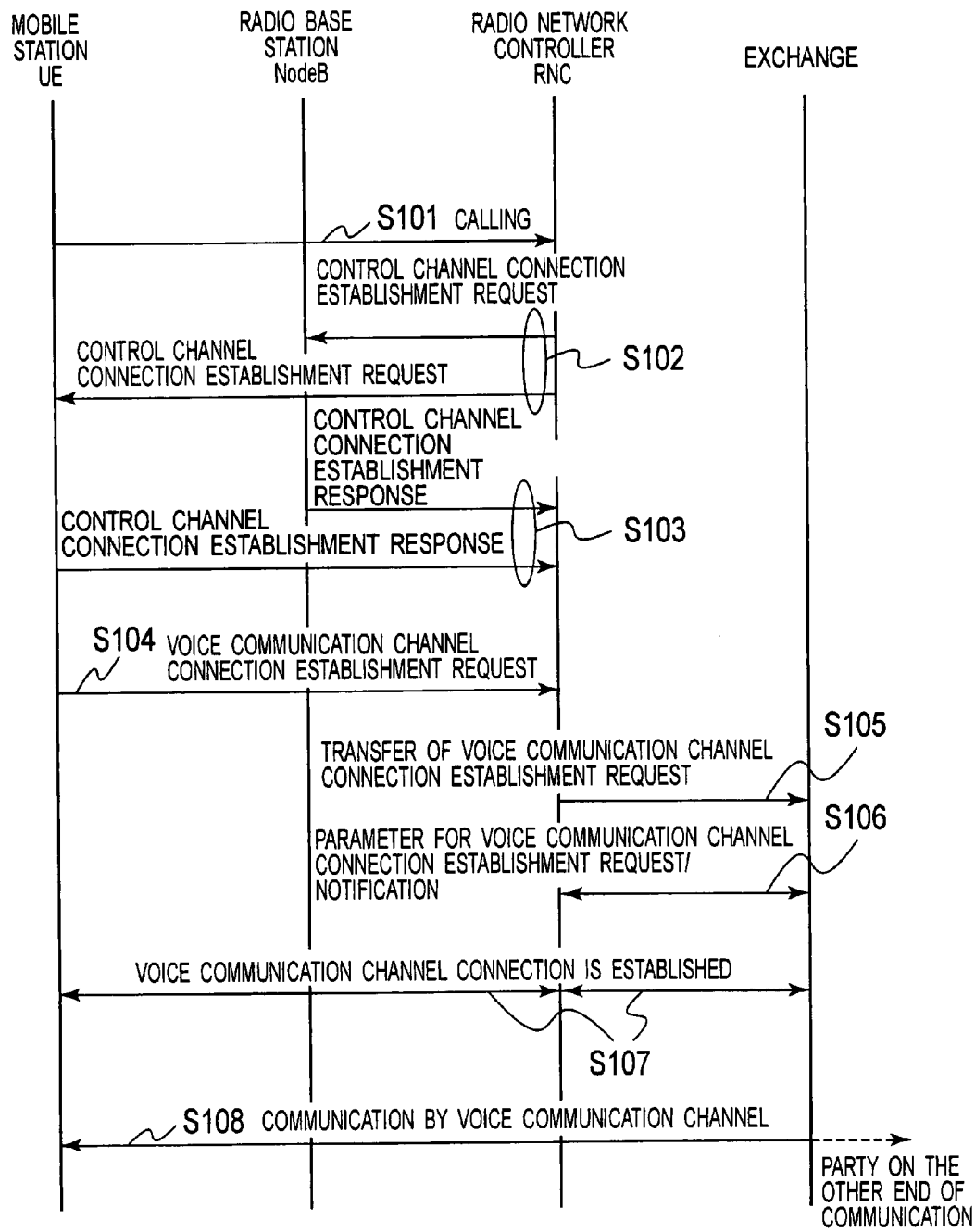
FIG. 12 is a sequence diagram showing communication which is performed using a channel for voice communication by the mobile station of the third embodiment of the present invention.

Next, referring to FIG. 12, operation is described in which a mobile station UE makes voice communication using a channel for voice communication in the mobile communication system of the present embodiment.

As shown in FIG. 12, in Step S101, a mobile station UE makes a call to a radio network controller RNC.

In Step S102, the radio network controller RNC makes a connection establishing request for a control channel, to the mobile station UE and a radio base station Node B. This control channel is a channel for setting the call type and the like of the mobile station UE.

Further, when making the connection establishing request for the control channel, the radio network controller RNC may inform a "guaranteed bit rate" required when allocating a channel for voice communication to an enhanced dedicated channel (EDCH) "guaranteeing a bandwidth".

In Step S103, the mobile station UE and the radio base station Node B start the transmitting/receiving of a control channel, in response to the connection establishing request for the control channel received from the radio network controller RNC in Step S102. When synchronized, the mobile station UE and the radio base station Node B make a connection-establishing response for a control channel, informing the synchronization.

In Step S104, the mobile station UE makes a connection-establishing request for a channel for voice communication to the radio network controller RNC.

In Step S105, the radio network controller RNC transfers the connection-establishing request for the channel for voice communication received in Step S104, to an exchange of a PSTN network through the IMS.

In Step S106, if a connection establishment for the channel for voice communication is possible, the exchange requests parameters to the radio network controller RNC, the parameters being necessary in establishing a connection for the channel for voice communication.

In Step S107, connections for a channel for voice communication are established between the radio network controller RNC and the exchange, and between the radio network controller RNC and the mobile station UE, according to the parameters informed in Step S106 from the radio network controller RNC.

In Step S108, the mobile station UE makes communication under the VoIP with the channel for voice communication.

To be more precise, the mobile station UE establishes an END-TO-END connection with the party on the other end of the communication (through the IMS) using the SIP. The SIP signal for establishing the above connection is transmitted by an enhanced dedicated channel (EDCH) which "does not guarantee a bandwidth".

Further, the mobile station makes voice communication using the RTP, by the established connection. In the voice communication, the RTP signal is transmitted using the enhanced dedicated channel (EDCH) "guaranteeing a bandwidth", and the RTCP signal is transmitted by an enhanced dedicated channel (EDCH) "not guaranteeing a bandwidth". Incidentally, an RTP signal in which a header is not compressed may be transmitted by the enhanced dedicated channel (EDCH) "not guaranteeing a bandwidth".

(Operation and Effect of Mobile Communication System of Third Embodiment of the Present Invention)

According to the mobile station UE of the present embodiment, the enhanced dedicated channel (EDCH) guaranteeing a bandwidth or the enhanced dedicated channel (EDCH) not guaranteeing a bandwidth is allocated depending on the kind of signals for voice communication transmitted by the channel for voice communication. Thus, effective use of a radio resource (hardware resource in the radio base station Node B) is made possible while guaranteeing the quality of voice communication.

According to the mobile station UE of the present embodiment, a bandwidth is guaranteed to an RTP signal transmitting voice data, and best effort is made without guaranteeing a bandwidth to a signal (for example, an SIP signal or an RTCP signal) other than the RTP signal transmitting other data. As a result, the quality of voice communication is guaranteed, and at the same time, the effective use of a radio resource (hardware resource at a radio base station Node B) is made possible.

According to the mobile station UE of the present embodiment, a bandwidth is guaranteed to an RTP signal in which a header is compressed which is usually transmitted, and best effort is made without guaranteeing a bandwidth to a signal in which a header is not compressed. As a result, it is unnecessary to allocate a radio resource (hardware resource) to such a signal in a fixed manner, and a radio resource (hardware resource) can be shared with another mobile station UE, so that the efficiency in the use of a radio resource (hardware resource) can be enhanced to a great extent.

(Modification of Mobile Communication System of Third Embodiment of the Present Invention)

According to the mobile station of the present embodiment, the upper layer function unit 1131 has been described in FIG. 9, to transmit the user data for voice communication such as an RTP signal and the control data for voice communication such as an RTCP signal and an SIP signal, to a lower layer by using different flows. However, the function unit 1131 may alternatively transmit both data to the lower layer by using the same flow. In that case, since the data sizes of data containing an RTP signal, data containing an SIP signal, and data containing an RTCP signal are predictable in advance, the MAC-e function unit 1134 may be configured to discriminate the RTP signal, the SIP signal, and the RTCP signal, by using the data sizes, and thereby to allocate the enhanced dedicated channel (EDCH) "guaranteeing a bandwidth" or the enhanced dedicated channel (EDCH) "not guaranteeing a bandwidth".

INDUSTRIAL APPLICABILITY

As described above, according to the present invention, it is possible to provide a channel allocating method, a mobile station, and a radio base station, the channel allocating method being capable of enhancing efficiency in the use of a radio resource (hardware resource) for a channel for voice communication in the IMS so that a network capacity can be prevented from being reduced.

The invention claimed is:

1. A channel allocating method for an IP multimedia subsystem which connects a radio access network and an IP network to provide voice communication and non-voice communication, comprising the steps of;
    allocating, by the radio access network, an enhanced dedicated channel to which a scheduling by a base station is applied, to a channel for voice communication in a radio uplink, and
    guaranteeing a bandwidth using a guaranteed bit rate in said enhanced dedicated channel to an RTP signal containing a compressed header, in the channel for voice communication, and not guaranteeing a bandwidth to an RTP signal containing an uncompressed header, in the channel for voice communication.

2. The channel allocating method according to claim 1, wherein an HARQ process is applied to said enhanced dedicated channel.

3. The channel allocating method according to claim 1, wherein,
    a transmission rate control process is applied to said enhanced dedicated channel.

4. A radio base station used for an IP multimedia subsystem which connects a radio access network and an IP network to provide voice communication and non-voice communication, comprising:
    a channel allocating unit configured to allocate an enhanced dedicated channel to which a scheduling by a base station is applied, to a channel for voice communication in a radio uplink, and
    a bandwidth guaranteeing unit configured to guarantee a bandwidth using a guaranteed bit rate in said enhanced dedicated channel to an RTP signal containing a compressed header, in the channel for voice communication, and not guarantee a bandwidth to an RTP signal containing an uncompressed header, in the channel for voice communication.

5. The radio base station according to claim 4, wherein,
    an HARQ process is applied to said enhanced dedicated channel.

6. The radio base station according to claim 4, wherein,
    a transmission rate control process is applied to said enhanced dedicated channel.

* * * * *